Patented July 21, 1942

2,290,164

UNITED STATES PATENT OFFICE 2,290,164

POLYMERIZATION PRODUCT OF STYRENE AND UNSATURATED ESTERS AND METHOD OF MAKING THE SAME

Edgar C. Britton, Midland, Mich., Harry Borden Marshall, Toronto, Ontario, Canada, and Walter J. Le Fevre, Midland, Mich., assignors to The Dow Chemical Company, Midland, Mich., a corporation of Michigan No Drawing. Application February 23, 1938, Serial No. 191,959

10 Claims. (Cl. 260—86)

This invention concerns certain new polymerization products and a method of making the same. It particularly concerns inter-polymerization products obtained by polymerizing styrene in the presence of certain unsaturated esters of unsaturated acids.

Such esters, hereinafter termed "modifying agents," have the general formula:

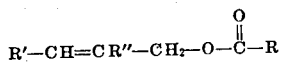

wherein R' represents alkyl, aryl, or hydrogen, R" represents alkyl or hydrogen, and R represents an organic radical containing at least one ethylenic linkage. Specific examples of such esters are: methallyl cinnamate, cinnamyl cinnamate, cinnamyl crotonate, methallyl allylacetate, allyl acrylate, methallyl acrylate, allyl furoate, allyl methacrylate, ethylallyl vinylacetate, etc.

The inter-polymerization products of styrene and such modifying agents vary in form from clear transparent resins to opaque white powdery materials depending on the conditions under which the polymerization is carried out. All such products may be molded, the procedure usually being that employed in molding other resins, to obtain clear transparent objects which display less tendency than polystyrene itself to blush or craze on standing. All of the new products possess excellent dielectric properties and are adapted to use as, or in, electric insulators. They are also adapted to a wide variety of other uses, such as the preparation of optical lenses; films; varnishes, lacquers, paints and other coating compositions; laminated glass; etc.

The polymeric products obtained by polymerizing a mixture of styrene and the modifying agent at temperatures above 180° C. are clear resins, usually soluble in aromatic solvents such as benzene, toluene, xylene, etc., whereas the polymers prepared at lower polymerizing temperatures are relatively insoluble in such solvents. The polymers obtained by polymerizing at temperatures between 110° and 180° C. are usually clear resins which, although nearly insoluble in the above mentioned solvents, usually have the property of swelling when contacted with such solvents. The presence or absence of this swelling characteristic is dependent upon other variable polymerizing conditions hereinafter discussed. The opaque powdery form of polymer is insoluble and non-swelling when in contact with the above solvents. It is obtained by effecting the polymerization at temperatures below 110° C., preferably between 50° and 80° C., and is frequently accompanied by a resinous polymer of the type which swells but does not dissolve in benzene and other aromatic solvents.

The products initially obtained in resinous form possess a number of characteristics, e. g. decreased solubility in aromatic solvents, gradual increase in molecular weight during their preparation by polymerization, etc., entirely distinct from those of polystyrene itself. These resinous products are believed to be new chemical compounds formed by chemical combination of the above mentioned modifying agents with styrene during the polymerization. The opaque powdery product may also be such a co-polymer, but, if so, it contains a much lower proportion of the modifying agent in chemical combination than do the resinous products.

The new polymers are prepared by mixing a minor proportion, preferably between 0.1 and 25 per cent, of the modifying agent with styrene, or partially polymerized styrene, i. e. a solution of polystyrene in monomeric styrene, and polymerizing the mixture. The polymerization may be carried out in any of the usual ways, e. g. by polymerizing the mixture directly in the presence or absence of added agents such as solvents, polymerization promoters, emulsifying agents, etc., although the nature of the polymer may vary somewhat with changes in the conditions of polymerization. The factors having greatest influence on the properties of the polymer are the proportion of modifying agent employed, the temperature at which the polymerization is carried out, and the time of the polymerization. The use of polymerization accelerators such as benzoyl peroxide, ozone, etc., in considerable proportion may tend to embrittle and lower the molecular weight of the products, but such promoters are effective when employed in very small proportion, e. g. 0.25 per cent by weight or less, in which case they have very little effect on the properties of the product. Other conditions such as the presence or absence of reaction solvents have relatively little influence on the physical properties of the polymers, but they may influence the form of the polymer, e. g. the polymerization may be carried out in the presence of a swelling solvent such as benzene, toluene, etc., to produce the product in the form of a gel which may be precipitated with a non-solvent such as ethanol.

Polymerization occurs slowly, if at all, when a liquid mixture of styrene and a modifying agent is permitted to stand in the dark at room temperature, thus permitting such mixture to be prepared and thereafter shipped in closed containers to the ultimate consumer where it may be polymerized in any desired manner. The liquid mixture may also be stabilized against polymerization by light or moderately elevated temperatures by the addition of an inhibitor such as quinone, trinitrobenzene, etc.

Because of the low rate at which the mixture of styrene and the modifying agent polymerizes, it is preferable to accelerate the polymerization by the use of heat, actinic light, or an accelerating agent such as benzoyl peroxide, ozone, strong mineral acid, etc. In practice, the polymerization is usually carried out at temperatures between 50° and 180° C., although still higher temperatures, e. g. 250° C. may be employed if desired. A small proportion, e. g. 0.25 per cent by weight or less, of an accelerating agent such as benzoyl peroxide may advantageously be employed to accelerate the reaction.

The solid polymer initially formed at a given temperature is usually of the type soluble in benzene, but the polymerization may be continued to form ultimate polymers of higher molecular weight which are also usually soluble when the polymerization is carried out at temperatures above 180° C., but which usually are nearly insoluble when prepared at temperatures between 110° C. and 180° C. As hereinbefore stated, the opaque powdery polymer which is insoluble and non-swelling in benzene is an ultimate product when polymerizing at temperatures below 110° C. The rate at which such products are formed increases with increase in the proportion of modifying agent present in the mixture. Also, the rate of polymerization increases with increase in the polymerization temperature. Accordingly there are at least three operating conditions, i. e. temperature, time of polymerization, and proportion of modifying agent which may be varied in producing inter-polymerization products of the present type and considerable flexibility in the operating conditions for preparing the products is permitted.

Regardless of the particular conditions under which the polymerization is carried out, the viscosity of the liquid mixture increases during polymerization until solidification occurs, after which the average molecular weight of the polymer continues to increase until the polymerization is complete. Similar behavior is observed when the polymerization is carried out in an emulsion or solution. For example, when styrene and one of the modifying agents of the present class are dissolved in benzene or a similar solvent and thereafter polymerized, the solution gradually becomes more viscous until gelatination occurs. When such solvent is employed in an amount not exceeding the weight of the styrene, further polymerization to produce higher molecular weight polymers which display only a slight tendency to swell in benzene is possible, but the use of a larger proportion of solvent may inhibit such further polymerization.

Accordingly, liquid mixtures of desired viscosity or solid polymers which, when dissolved in an organic solvent, give solutions of desired viscosity are obtainable when operating in accordance with the invention. Such products are adapted to use in lacquers, varnishes, paints, etc., and they may frequently be employed to obtain films suitable for use in photography or as wrapping materials.

As shown above, the polymerization may be stopped at intermediate points or continued to completion to obtain a large number of polymerized products varying over a wide range in such characteristics as molecular weight, solubility in benzene, physical appearance, etc. When the polymerization is carried out at elevated temperatures using little or no reaction promoter, it may be interrupted merely by cooling the mixture to room temperature or thereabouts, after which further polymerization is not noticeable.

The solid insoluble polymers are usually obtained in a form suitable for molding without further purification, but if especially refined products are desired, the initial products may be ground, extracted with a solvent such as acetone or ethanol to remove any unpolymerized styrene, and dried to form molding powders. When the polymer is one capable of being swelled, it may be dispersed in a swelling solvent such as benzene and then precipitated in finely divided form with a non-swelling solvent such as ethanol. As in the case of molded polystyrene itself, the physical properties, e. g. tensile strength, impact strength, etc., of the new resins vary somewhat with the purity of the polystyrene employed in preparing them.

The following examples will illustrate various ways in which the invention has been applied, but are not to be construed as limiting the same:

*Example 1*

A mixture of 100 parts of styrene and 1 part of allyl cinnamate is heated at 140° C. for 64 hours. The polymerized product is a glass-like thermoplastic resin which swells but does not dissolve in benzene and other aromatic solvents. Objects molded from this polymer are clear, transparent resins having excellent strength and dielectric characteristics.

*Example 2*

A mixture of 400 parts of styrene and 1 part of allyl methacrylate is polymerized by heating at 140° C. for 18 hours. The product is a clear resin, soluble in aromatic solvents and capable of being molded by ordinary procedure. A polymer containing 1 per cent of the modifying agent is identical in appearance but is insoluble in benzene.

*Example 3*

A mixture of 90 parts of styrene and 10 parts of allyl furoate is heated at 100°–110° C. for 5 days. The polymer obtained is dispersed in benzene, precipitated with ethanol, and molded at 150° C. The molded specimen is a tough, transparent resin, insoluble in most organic solvents and swelling only slightly in benzene. It shows a tensile strength of approximately 3700 lbs./sq. in., and a Shore sceleroscope hardness of about 70.

*Example 4*

A mixture of 200 parts of styrene, 4 parts of allyl cinnamate, and 1 part of benzoyl peroxide is heated at 180° C. for 8 hours. The polymeric product is soluble in benzene but insoluble in acetone and ethanol.

*Example 5*

A mixture of 100 parts of styrene and 1 part of allyl crotonate is polymerized by heating at 140° C. for 19 hours. The polymer obtained is a clear transparent resin, insoluble in acetone and ethanol, but soluble in benzene and other aromatic solvents. A similar polymer containing 8 per cent of the modifying agent is insoluble in such solvents but swells to a stiff gel when contacted therewith.

Example 6

100 parts of styrene is mixed with 20 parts of allyl cinnamate and the mixture polymerized by heating at 70°–80° C. for 6 days. During polymerization, there forms within the mixture an opaque white material resembling a mass of cotton linters in appearance. The completely polymerized product is a colorless mass having suspended therein a substantial quantity of such opaque product. The opaque material is ground to a fine powder and in this manner it is separated from the mixture since the transparent material is not easily ground. In pulverized form, the opaque polymer has the appearance of powdered sugar or starch, although it is somewhat harder and has a peculiar elastic feel when rubbed between the fingers. It is insoluble and non-swelling in aromatic solvents whereas the transparent polymer swells in such solvents. Accordingly, the two types of polymers may be separated by swelling the transparent material to a thin gel in a large amount of benzene and decanting such gel from the insoluble opaque material. A molded test specimen prepared by molding the opaque material under pressure at 170° C. is a clear transparent resin having a tensile strength of approximately 4800 lbs./sq. in. and a Shore hardness of 80.

Example 7

A mixture of 100 parts of styrene and 10 parts of methallyl cinnamate is heated at 60°–70° C. for 10 days. The polymerized product is for the most part a swollen white mass identical in appearance with the opaque product obtained in Example 6. This material is washed with acetone, dried, and ground to a fine white powder which is insoluble and non-swelling, and which has good molding and dielectric characteristics.

Example 8

90 parts of styrene and 10 parts of methallyl oleate is heated at 100° C. for 6 days to give a resinous polymer, insoluble in acetone and alcohol, but soluble in benzene and other aromatic solvents. A product having similar properties is obtained by heating a mixture of 95 parts of styrene and 5 parts of methallyl crotonate at 100°–110° C. for 6 days.

Example 9

A sample of monomeric styrene is polymerized to a thick viscous liquid by heating at 125° C. for several hours. A mixture comprising 90 parts of the partially polymerized styrene and 10 parts of allyl cinnamate is added dropwise with rapid stirring to a solution of 4 parts of an emulsifying agent such as albumin, sodium caseinate, etc., in water. The thick stable emulsion which forms is then polymerized by heating at 100° C. for 6 days to give a soft, white, solid polymer which swells slightly in benzene. A molded specimen of this material is softer and shows a lower heat distortion figure than the material obtained by polymerizing a simple mixture of styrene and modifying agent.

Example 10

A mixture of 95 parts of styrene and 5 parts of cinnamyl cinnamate is dissolved in 100 parts of benzene and heated under reflux for 5 days. The reaction mixture polymerizes to a firm insoluble gel from which the interpolymerization product may be precipitated with ethanol. A molded specimen of the precipitated product is a clear transparent resin having good strength and dielectric characteristics.

Example 11

A mixture of partially polymerized styrene prepared as in Example 9, and allyl furoate is heated at 140° C. for 10 hours. The colorless, resinous polymer obtained swells in benzene but does not dissolve.

Example 12

A mixture of 100 parts of styrene and 10 parts of allyl methacrylate is heated at 60°–70° C. for 10 days. The polymerized product comprises approximately equal parts of a white powdery material identical in appearance with the opaque product obtained in Example 6, and a transparent glass-like resin. The opaque polymer is separated from the glass-like material and is washed with acetone, dried, and ground to a fine white powder which is insoluble and non-swelling in benzene. The powder may be molded to obtain a clear, transparent resin having good strength and dielectric characteristics.

The liquid mixtures of styrene and a modifying agent hereinbefore described may, if desired, be polymerized in the presence of added agents such as dyes, pigments, fillers, etc., to obtain polymerized products comprising such added agents and having properties modified by the presence of such agents. Also, such addition agents may be incorporated with the solid polymers before molding to produce decorative effects or to modify certain properties of the molded product.

Other modes of applying the principle of our invention may be employed instead of those explained, change being made as regards the method herein disclosed, or the material employed, provided the step or steps stated by any of the following claims be employed or the product claimed in any of the following claims be obtained.

We therefore particularly point out and distinctly claim as our invention:

1. The process which comprises polymerizing styrene with between 0.1 and 25 per cent of its weight of allyl cinnamate.

2. The process which comprises polymerizing styrene with between 0.1 and 25 per cent of its weight of methallyl cinnamate.

3. The products of the conjoint polymerization of styrene and between about 0.1 and about 25 per cent by weight of allyl cinnamate.

4. The products of the conjoint polymerization of styrene and between about 0.1 and about 25 per cent by weight of methallyl cinnamate.

5. The process which comprises polymerizing styrene together with between 0.1 and 25 per cent of its weight of an ester of a monobasic acid having the general formula R—COO—CH$_2$—R' wherein one of the radicals R and R' is the styryl radical and the other is a hydrocarbon radical containing at least one ethylenic linkage.

6. The process of preparing a resin, substantially insoluble in benzene, which comprises heating at a temperature between 50° and 180° C. styrene together with between 0.1 and 25 per cent of its weight of an ester of a monobasic acid having the general formula R—COO—CH$_2$—R' wherein one of the radicals R and R' is the styryl radical and the other is a hydrocarbon radical containing at least one ethylenic linkage.

7. The process which comprises polymerizing while in an aqueous emulsion styrene together with between 0.1 and 25 per cent of its weight of an ester of a monobasic acid having the general formula R—COO—CH$_2$—R' wherein one of the radicals R and R' is the styryl radical and the other is a hydrocarbon radical containing at least one ethylenic linkage.

8. The process which comprises polymerizing partially polymerized styrene together with between 0.1 and 25 per cent of its weight of an ester of a monobasic acid having the general formula R—COO—CH$_2$—R' wherein one of the radicals R and R' is the styryl radical and the other is a hydrocarbon radical containing at least one ethylenic linkage.

9. The process which comprises partially polymerizing styrene together with between 0.1 and 25 per cent of its weight of an ester of a monobasic acid having the general formula $$R—COO—CH_2—R'$$

wherein one of the radicals R and R' is the styryl radical and the other is a hydrocarbon radical containing at least one ethylenic linkage, stopping the polymerization before a solid polymer separates from the mixture, and thereafter distilling off any unpolymerized material.

10. The products of the conjoint polymerization of styrene and between 0.1 and 25 per cent of its weight of an ester of a monobasic acid having the general formula R—COO—CH$_2$—R' wherein one of the radicals R and R' is the styryl radical and the other is a hydrocarbon radical containing at least one ethylenic linkage.

EDGAR C. BRITTON.
WALTER J. LE FEVRE.
HARRY BORDEN MARSHALL.